Figure 3:
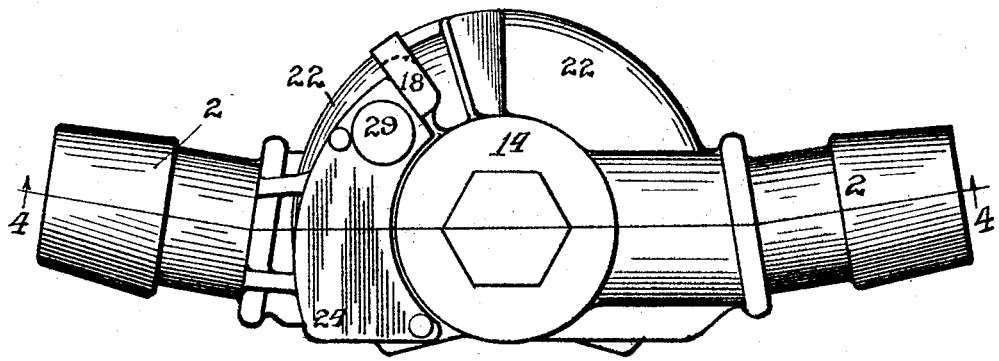

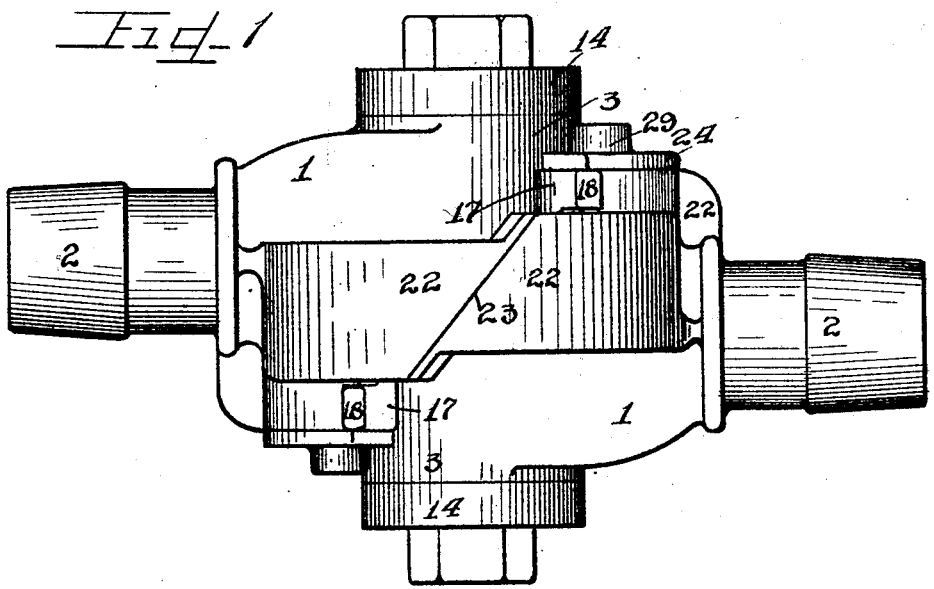
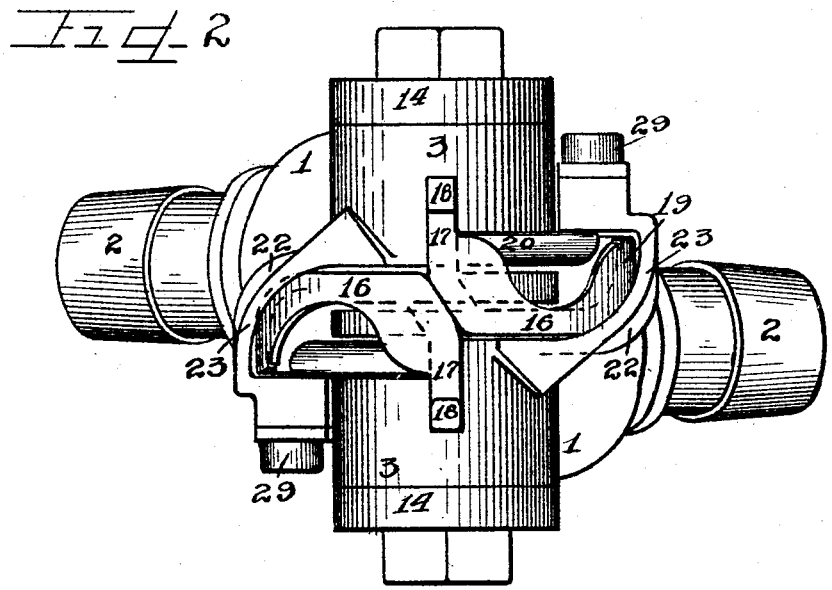

O. P. WILHELM.
SAFETY HOSE COUPLING.
APPLICATION FILED MAR. 9, 1914.

1,199,024.

Patented Sept. 19, 1916.
4 SHEETS—SHEET 2.

Witnesses
J. W. Angell
Charles W. Hills Jr.

Inventor
Oliver P. Wilhelm
by Charles W. Niee
Atty.

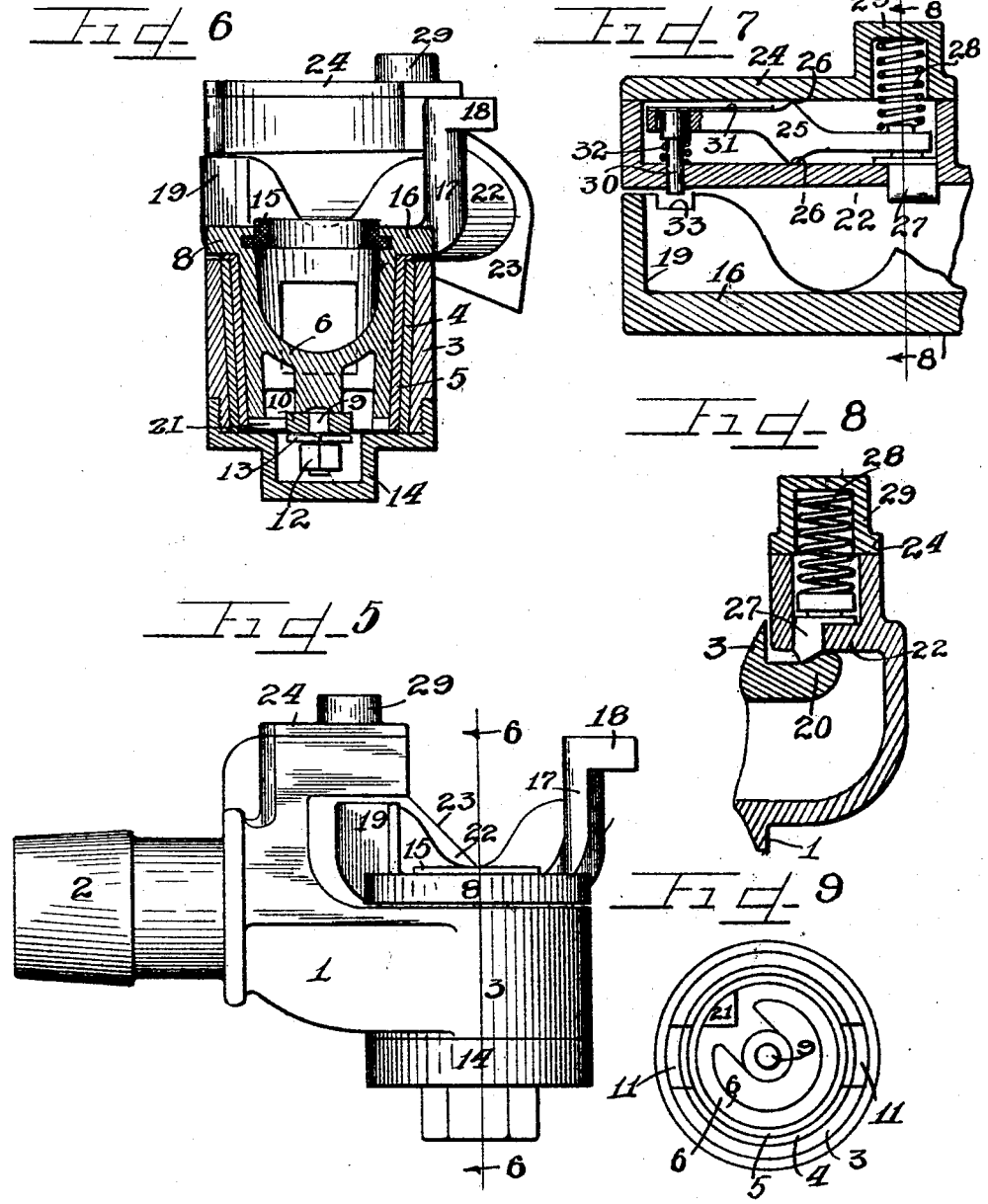

O. P. WILHELM.
SAFETY HOSE COUPLING.
APPLICATION FILED MAR. 9, 1914.
1,199,024.
Patented Sept. 19, 1916.
4 SHEETS—SHEET 4.
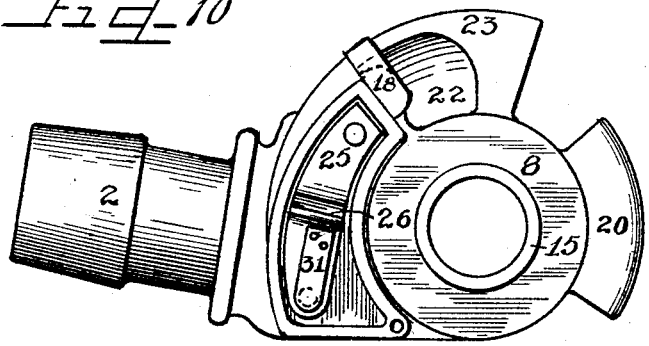
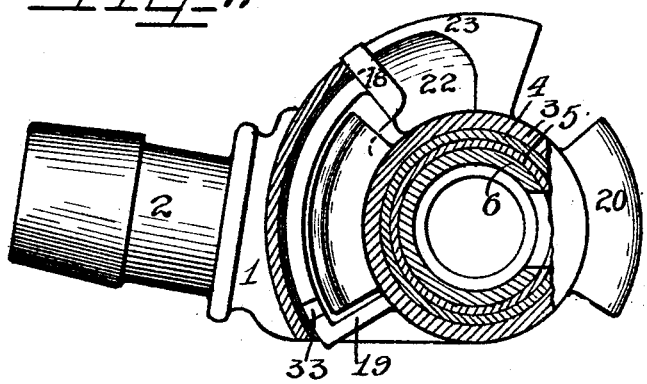
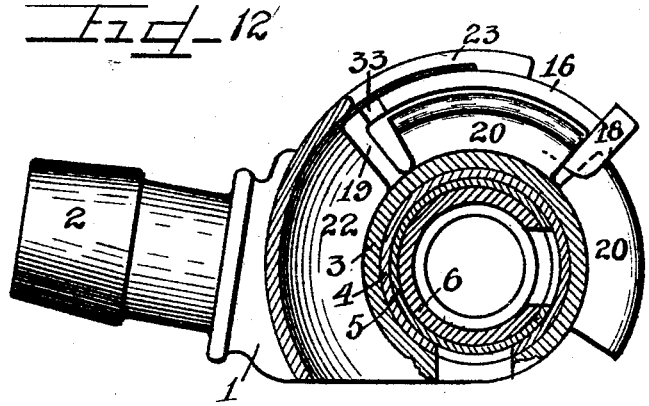
Witnesses
J. W. Angell
Charles W. Hills Jr.
Inventor
Oliver P. Wilhelm
by Charles W. Fille
Atty.

UNITED STATES PATENT OFFICE.

OLIVER P. WILHELM, OF MICHIGAN CITY, INDIANA.

SAFETY HOSE-COUPLING.

1,199,024.　　　　　Specification of Letters Patent.　　Patented Sept. 19, 1916.

Application filed March 9, 1914. Serial No. 823,340.

*To all whom it may concern:*

Be it known that I, OLIVER P. WILHELM, a citizen of the United States, and a resident of Michigan City, Laporte county, Indiana, have invented certain new and useful Improvements in Safety Hose-Couplings; and I do hereby declare that the following is a full, clear, and exact description of the same, reference being had to the accompanying drawings, and to the numerals of reference marked thereon, which form a part of this specification.

Many types of hose couplings have been devised for use on railroad trains whereby the acts of coupling or uncoupling the device acts to open or close the valves therein. It is desirable that in the event of a car accidentally breaking away from a train that the valves on the air line remain open, so that the respective brakes on each portion of the train will be immediately and automatically set. Of course the valve mechanisms are in open position when the device is coupled, but due to the sudden pulling away of the coupling heads when a train breaks into sections, the valves are sometimes closed, and the brakes are not set, thereby endangering life and property.

This invention relates particularly to a hose coupling attached in the air brake system of a railroad train whereby two engaging interlocking coupling heads provided with independently operatable rotatable valve mechanisms arranged to open and close with the coupling and uncoupling operation of the device are associated with a mechanism for positively locking the valves in open position temporarily during the time that the heads are being accidentally pulled apart, and not properly uncoupled from one another.

It is an object of this invention to construct a hose coupling wherein mechanism is associated within the casing of each of the coupling heads to be actuated by a part of the interlocking means of a complemental head to prevent closing of the valves within the head when the coupling heads are separated or pulled apart without properly uncoupling the same.

It is also an object of this invention to provide a safety device in combination with a coupling head whereby the valve mechanism in the head is positively locked from moving to closed position for a brief interval during the pulling apart of the coupling heads when the same are not properly uncoupled from one another.

It is also an object of this invention to construct a hose coupling provided with a safety device for maintaining the valves in open position in the event of breaking away of the coupling heads.

It is also an object of this invention to construct a hose coupling wherein novel means are provided to prevent leakage around the valve elements and to prevent wedging of the valve elements within the coupling heads, and where the passages through the coupling heads and valve elements are rounded to register with one another and afford a smooth and easy path of flow for the fluid, and furthermore, wherein safety devices are associated in the coupler heads to temporarily insure the valve elements remaining in open position if the coupling heads are accidentally pulled apart.

It is a further object of this invention to construct a hose coupling embracing coupling heads complementally shaped to interfit with one another, and provided with valve elements rotatably mounted therein to open and close with the coupling and uncoupling operation and coöperating with safety devices to maintain said valve elements temporarily open against accidental closing when the coupling heads are accidentally pulled apart.

It is finally an object of this invention to construct a simple, economical and efficient hose coupling consisting of few parts and embodying a number of features correcting inadequacies in present constructions.

The invention (in a preferred form) is illustrated in the drawings and hereinafter more fully described.

Figure 4:
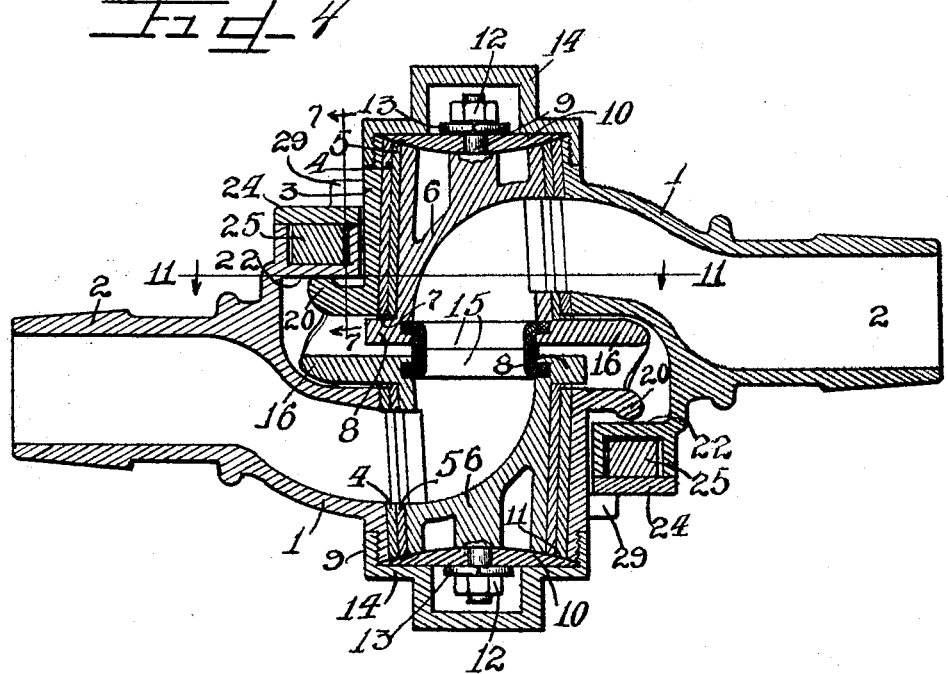

In the drawings: Figure 1 is a top plan view of a pair of coupling heads embodying my invention coupled and locked together. Fig. 2 is a similar view with the parts rotated to uncoupling position. Fig. 3 is a side elevation of the heads in the position shown in Fig. 1. Fig. 4 is a section taken on line 4—4 of Fig. 3. Fig. 5 is a bottom plan view of one of the coupling heads with the valve in closed position, the parts being properly arranged preliminary to coupling. Fig. 6 is a section taken on line 6—6 of Fig. 5, with the valve rotated to open position. Fig. 7 is a fragmentary section taken on line 7—7 of Fig. 4. Fig. 8 is a fragmentary section taken on line 8—8 of Fig. 7. Fig. 9 is a fragmentary side elevation of one of the coupling heads with the cap and the locking bar of the valve removed. Fig. 10 is a side elevation of one of the coupling heads with the valve in open position and the small cover removed from the casing inclosing the safety device. Fig. 11 is a section taken on line 11—11 of Fig. 4 with parts broken away. Fig. 12 is a similar view with the valve in closed position.

As shown in the drawings: Inasmuch as each of the coupling heads is identical in form and construction a description of one will suffice. The coupling head is denoted as a whole by the reference numeral 1, and is provided with a nipple 2, adapted to receive a hose end thereover. A laterally directed cylindrical barrel 3, is formed integral with said casing or head 1, forming a part thereof, and is provided with a frusto-conical interior into which is shrunk a brass bushing 4, also conical in shape. Another conical brass bushing 5, ground to fit accurately and closely around a conical valve element 6, is mounted within said bushing 4, and at its lower or inner end is flanged outwardly, as denoted by the reference numeral 7, affording a stop to limit the movement of said valve element 6, by contact with a peripheral flange 8, around the end thereof. Each of said stationary bushings 4 and 5, is apertured to register with the passage through the casing 1, leading from said nipple 2, through said cylindrical portion 3, permitting the rounded passage through said valve element 6, to register therewith. The outer end of said valve element 6, is provided with a stem 9, which projects through a central aperture in a cross-bar 10, the ends of which rest in diametrically disposed recesses 11, in said barrel 3, and bushings 4 and 5, thus preventing rotational movement of said bushings within said barrel, and also affording retaining means for said valve element to hold the same inserted in position in the inner bushing 5. For this purpose, the outer end of said stem 9, is threaded and a nut 12, is secured thereon over a spring washer 13, whereby said valve element 6 is held in position closely within said bushing 5, in sealing relation therewith. A cap 14, is threaded on the outer end of said barrel 3, of the coupling head closing over to protect and conceal said nut and locking bar for the valve element.

Fiber or rubber washers 15, are sprung into place in recesses for the purpose in the ends of each of the respective valve elements 6, which abut one another, so that said washers when the heads are coupled, are clamped tightly together in sealing relation. When the heads of the coupling are about to be coupled together they are brought together at an angle with one another, as shown in Fig. 2, and with the valve elements in the position shown in Fig. 12. The coupling heads and the valve elements are then rotated into the position shown in Figs. 1 and 3, so that the respective apertures in the coupler heads and valves move into register with one another and communication is established therethrough between the passages in the respective heads.

For the purpose of rotating a coupler head and its valve in opposite directions in coupling the heads together, the flange 8, on the inner end of each of the valve elements, is extended, as denoted by the reference numeral 16, on one side thereof and at one end of said flange an upright actuating finger 17, is formed integral therewith, having a finger piece 18, at its end, and at the other end of said flange 16, an abutment wall 19, is integrally formed thereon, adapting a lip 20, formed around the outer end of the coupling head on the lower end of the barrel 3, to fit over said flange 16, between said finger 17, and said abutment wall 19. Thus when the coupling heads are rotated in reverse directions during a coupling operation, the valve element in one coupling head will be moved by the lip on the other coupling head to the proper open position. For the purpose of limiting the rotational movement of the valve element 6, within the barrel 3, an abutment or stop 21, is formed integrally on the inner surface of the outer end portion of said valve element and with the valve in one extreme position, for instance that in which it is open, said abutment 21, contacts one side of said bar 10, diametrically across the top of said barrel 3, and when the valve element rotates into its other extreme position, or that with the valve closed, said abutment 21, contacts the other side of said bar 10.

A small semi-peripheral curved housing 22, is formed on the outer surface of the coupling head on one side thereof and is adapted to receive rotated thereinto the flanged portion 16, and abutment wall 19, of the valve element, as well as the lip 20, of a complemental coupling head, said lip engaging beneath a slightly inclined wall of said housing, which acts as a cam to hold the heads together and maintain the same coupled. The outer or terminating edge or face of said housing 22, is angled, as denoted by the reference numeral 23, so that the respective housing portions of each of the coupling heads abut one another along said inclined end, as clearly shown in Fig. 1, and each of said housings is cut away along one wall thereof to receive the fingers 17, therethrough, as the valve element is rotated and the flange portion and abutment wall 16 and 19, respectively, are rotated into concealed position within said housing members. When the coupling heads are brought together preliminary to coupling, they are positioned with the respective valve barrels 3, co-axial with one another, and with the respective fingers 17, engaging over one end of the lips 20, and when the coupling heads are rotated into the position shown in Fig. 1, said lip portions, abutting against the abutment wall 19, serve to rotate the valve with its associated elements into and within the housing 22, until the inclined faces 23, of said housings abut one another.

Oftentimes a train will break in two, that is to say the cars become accidentally uncoupled from one another, and at this time it is desirable that the valve elements within said coupling heads remain in open position to release the air and automatically set the brakes. However, it has been found in practice that oftentimes the lip 20, on the barrel 3, when the two heads are pulled away from one another without moving through the required angle for uncoupling, will accidentally catch upon some portion of the valve element, as for instance the finger portion 17, thus rotating the valve into closed position. In order to prevent this, I provide a safety device which acts to automatically and positively hold the valve elements in open position during the interval of time that the coupling heads are pulling apart, and immediately thereafter the automatic mechanism returns to normal position out of use. For this purpose, outwardly projecting walls are provided on the outer side of said housing 22, adapted to receive a cover 24, removably thereon, thus forming a compartment within which is mounted a lever 25, upon knife edges 26, formed thereon for the purpose. One end of said lever 25, is provided with a depending lug 27, which projects through an aperture in the casing wall of said housing 22, and a spiral spring 28, bears on the end of said lever and within a cylindrical enlargement 29, in said cover 24, to normally impel said lever into a position with said lug projecting through the aperture. The lug projecting through the aperture in the wall of said housing 22, is so positioned that in the normal rotational movement of a lip 20, on a complemental coupling head, the upwardly projecting or beaded portion of said lip 20, travels around outside said lug 27, without in any way tending to move the same, as clearly shown in Fig. 8, but in the event of a parting of the coupling heads, due to accident, said lip 20, is pulled directly across said lug 27, thus impelling the same upwardly against the pressure of the spring 28, and moving the other end of said lever 25, downwardly. A pin 30, is mounted in an aperture in the other end of said lever 25, and is held in operative position by a strong leaf spring 31, and a small spiral pushing spring 32, bearing against the wall of the housing and said pin, acts to normally hold the pin retracted. In order to temporarily lock the valve element from movement when said coupling heads part under the aforesaid accidental conditions, a notch 33, formed in the abutment wall 19, of the valve element of the other or complemental coupling head, is engaged by said pin 30, projected downwardly by the movement of said lever 25, to hold the valve element from rotational movement should the lip 20, accidentally engage the finger 17, to rotate the same toward closed position. The purpose of mounting the pin 30, in the manner described in the lever 25, is to avoid jamming of the parts in the event that the recess 33, should become filled with ice or dirt and prevent an engagement of said pin 30.

The operation is as follows: The normal coupled position of the parts is shown in side elevation in Fig. 3, and in section in Fig. 4, that is, with the respective valves open, and the passages through the coupling heads communicating with one another, and sealed by the washers 15. When the heads are about to be coupled to one another they are brought into the position shown in Fig. 2, that is with the barrel portions 3, in alinement, but with the heads angled with respect to one another, so that with the finger portion 17, rotated outwardly to its limiting position as determined by the stop 21, on the valve within the barrel 3, the lip portions of the respective coupling heads may be engaged between said finger 17, and abutment walls 19, whereupon the respective coupling heads are rotated relatively to one another. This causes the lips 20, to move inwardly into the housing 22, with the lips engaging against the inclined cam wall thereof, and the abutment portion 19, and finger portion 17, being integral with the valve element and moving with said lip cause the valve to be rotated into an open position. The interaction of the lips 20, with the walls of the housing 22, with which they engage, serves as a clamp to bring the coupling heads tightly together, the inclined wall of said housing 22, causing said lip to wedgingly engage therewith for the purpose.

When the coupling heads are coupled to one another the limit of movement is reached as shown in the plan view in Fig. 1, that is, with the inclined abutting faces 23, contacting one another and with the finger pieces 17, rotated closely into an adjacent position to the safety compartment sections of the housing 22, so that no projecting portions are in evidence upon the device which might accidentally become caught or be struck to throw the device into a released position.

As already stated, the position of the lug 27, of the safety mechanism of the device is on an arc of less radius than that of the beaded portions of the lip 20, as clearly shown in Figs. 8 and 11, so that during the ordinary rotational movement of locking the coupling heads together, said lug is not moved by said lip. However, in the event of a car becoming accidentally detached from a train and the hose coupling heads being pulled apart without the rotational movement used in uncoupling the same, said beaded portion of the lip 20, will be pulled over and against said lug 27, in its passage thereby, thus impelling the pin 30, downwardly into the recess 33, and preventing an accidental rotational movement of the valve into a closed position. Obviously, when a car breaks away from a train, it is not desirable to have the valve become closed, for otherwise the brakes would not be set and accidents more serious would follow.

I am aware that various details of construction may be varied through a wide range without departing from the principles of this invention, and I therefore do not purpose limiting the patent granted otherwise than necessitated by the prior art.

I claim as my invention:

1. A hose coupling comprising two heads, a lip on each thereof, a housing on each of said heads adapted to receive the lip of a complemental head therein to bring said heads together, valve elements rotatable in said heads, means thereon adapted to be engaged by said lips to rotate said valve elements when said heads are coupled together, and means in each of said heads operated directly by the complemental head for locking said valve elements from movement when said coupling heads are pulled apart without rotational movement.

2. In a device of the class described complemental interlocking interfitting coupling heads, rotatable valve elements therein adapted to be thrown open to afford communication between said heads when the heads are coupled together, and mechanisms in each of said heads positively actuated by direct contact with the complemental head to lock said valve elements from rotation when said heads are pulled apart without the proper uncoupling operation.

3. In a device of the class described complemental interfitting coupling heads, valves rotatable therein, members on said valves adapted when in a certain position to insure a closed position of said valves preliminary to a coupling of said heads, mechanism on said heads adapted to engage said members to rotate said valves to open position when said heads are coupled, and means for locking said valves from rotation by engagement with said members when said coupling heads are pulled apart.

4. In a device of the class described interfitting interlocking coupling heads, valves rotatable therein, means associated with said valves to move the same into open and closed position, mechanism on each of said coupling heads adapted to engage said means to move said valves, and pivoted safety means operatable by said mechanism on said coupling heads to positively hold said valves from rotation in open position when said coupling heads are accidentally pulled apart.

5. In a device of the class described coupling heads, a valve rotatable in each thereof, an extended flange on each of said valves, an abutment on the end of each of said flanges, a lip formed on each of said coupling heads adapted to engage over the respective flanges of said valve elements between said abutments on the ends thereof, mechanism mounted within each of said coupling heads adapted to be operated by said lips when said coupling heads are pulled apart accidentally, and means actuated by said mechanisms to positively engage the abutments on said valves to prevent movement thereof and hold the same in open position.

6. The combination in a hose coupling of two coupling heads, means for interlocking said heads by rotating them in contact in opposite directions, valves rotatable in said heads adapted to be opened by said coupling operation, and mechanism normally out of contact with the valves acting to move into engagement therewith to hold said valves in open position when said heads are separated by a longitudinal pull.

7. The combination in a hose coupling of two duplicate heads having lateral communicating openings, valves controlling the flow therethrough, means for interlocking said heads against separation by rotating them in opposite directions, and for maintaining them locked when they have been rotated a certain amount, and mechanism acting momentarily to hold said valve in an adjusted position when said heads are separated without rotational movement.

8. The combination in a hose coupling of two duplicate heads having lateral communicating openings, valves adjustable therein to control the flow therethrough, curved interlocking means carried by said heads, and mechanism operated momentarily by said means to positively hold said valves for an instant from movement leaving the same in an adjusted open position when said heads are separated without the proper uncoupling operation.

9. The combination in a hose coupling of two duplicate heads having lateral communicating passages, valves rotatable therein to control the flow therethrough, interlocking means on said heads adapted to be engaged with one another by rotational movement of said heads, and mechanism positively operated by one member of said interlocking means to momentarily engage and hold said valves in an adjusted position leaving the same open when said heads are separated without a complete rotational uncoupling movement.

10. In a device of the class described coupling heads, means interlocking said heads by rotating them into contact in opposite directions, valves in said heads controlling the flow therethrough, mechanism on said valves engaged by said complemental heads to rotate said valves into an adjusted position during coupling or uncoupling of said heads, levers mounted in said heads, lugs thereon projecting into the path of one member of said interlocking means to be actuated thereby in the event of the separation of said heads without a proper rotational movement, and means actuated by said lever to positively engage said means on said valve to hold the same in adjusted position when the coupling heads are separated.

11. The combination in a hose coupling of two duplicate heads communicating with one another, valves rotatable therein for controlling the flow therethrough, and means acting momentarily to hold said valves in an adjusted position when said heads are separated without rotational movement.

12. The combination in a hose coupling of two coupling heads, a rotatable valve in each of said heads, means for interlocking said heads by rotating them in contact in opposite directions, and mechanism acting momentarily to hold said valves in an adjusted position when said heads are separated without rotational movement.

13. In a device of the class described, interfitting interlocking coupling heads, means for interlocking the same, valves rotatable therein, and means for momentarily locking said valves from rotation when said coupling heads are pulled apart.

In testimony whereof I have hereunto subscribed my name in the presence of two subscribing witnesses.

OLIVER P. WILHELM.

Witnesses:
 CHARLES W. HILLS, Jr.,
 FRANK K. HUDSON.

Copies of this patent may be obtained for five cents each, by addressing the "Commissioner of Patents, Washington, D. C."